Patented June 23, 1953

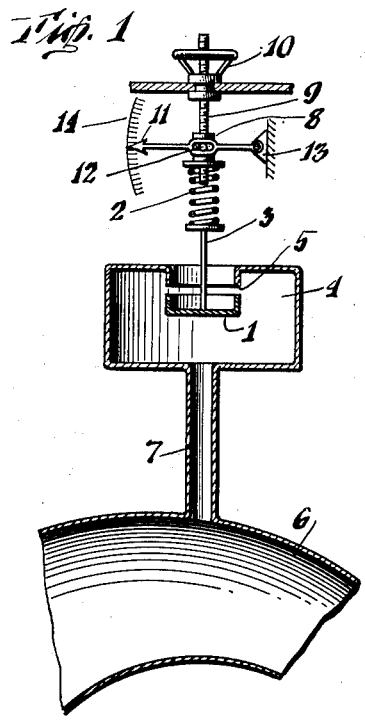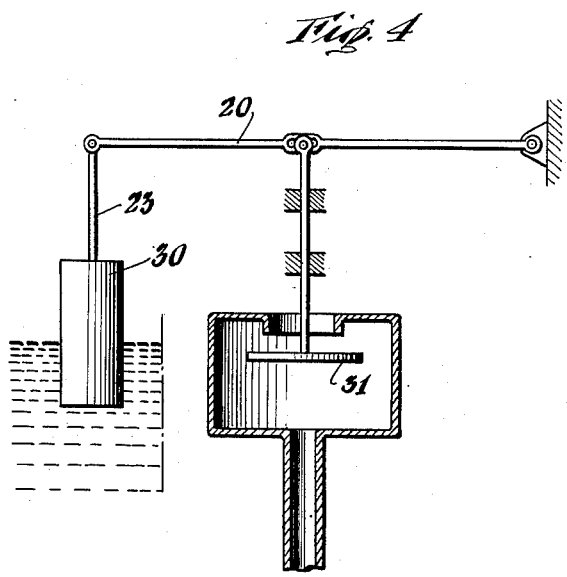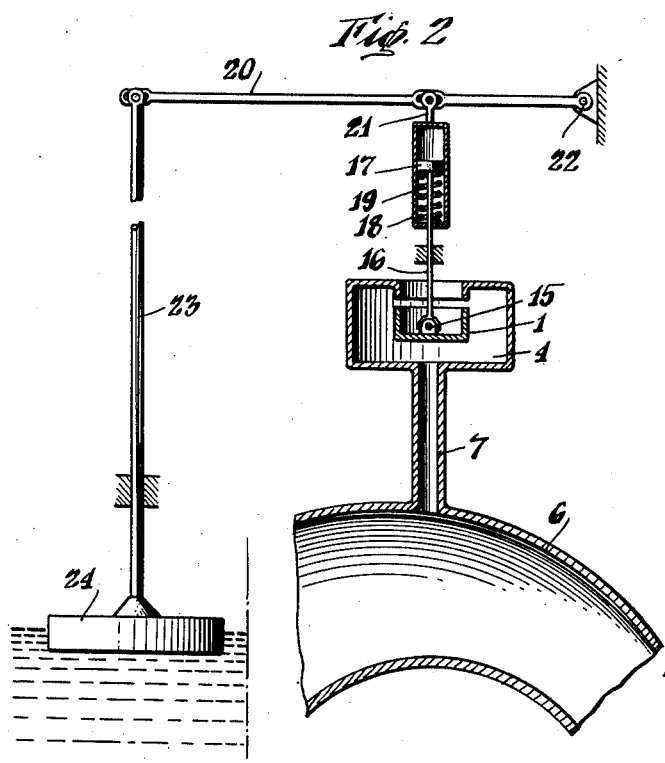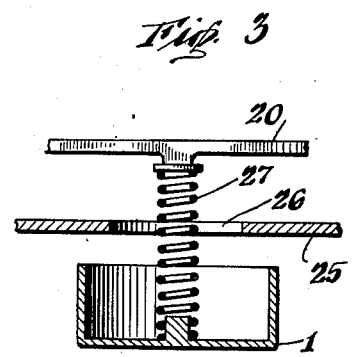

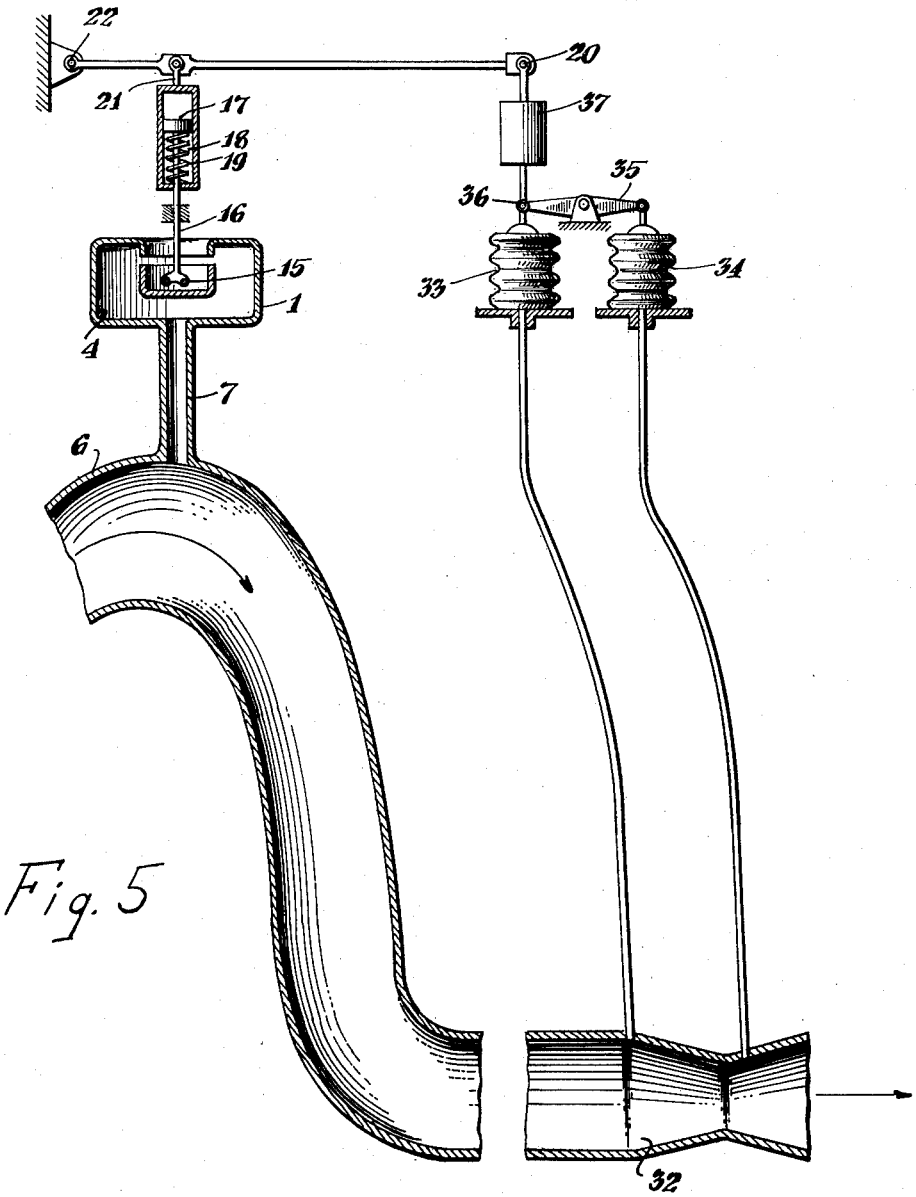

2,642,888

UNITED STATES PATENT OFFICE 2,642,888

APPARATUS FOR REGULATING THE DISCHARGE OF LIQUIDS THROUGH SIPHONS

Pierre F. Danel, Grenoble, France, assignor to Etablissements Neyrpic, Grenoble, France, a corporation of France Application December 30, 1947, Serial No. 794,686
In France December 23, 1946

Section 1, Public Law 690, August 8, 1946
Patent expires December 23, 1966

10 Claims. (Cl. 137—143)

The present invention relates to systems for regulating the discharge of liquids through siphons used for various purposes, for example, as regulators of the level of a reservoir or other confined bodies of water. More particularly, the invention is concerned with systems of regulation permitting of a controlled partial discharge of the liquid by the introduction of air into the throat of the siphon. The air drawn in is continuously evacuated by entrainment with the water flowing through the siphon.

The discharge of a given siphon depends principally on the reduced pressure or difference in the pressures which govern it. When the opening for introducing air to the throat of the siphon is completely closed the siphon may be completely primed and the depression as well as the discharge will be at a maximum. Upon opening the air inlet the state of depression diminishes and the discharge is also lessened. If the amount of air so introduced is controlled so as not to break the siphon, an equilibrium will be established at the lower rate of discharge corresponding to the extent to which the air orifice is opened.

Likewise, when it is desired to vary the discharge of a siphon to correspond to a different height or volume of water, for example, a variation in the level of the water in a reservoir, it is necessary to regulate the depression in the siphon to a value determined according to the changed height or volume to be accommodated. In the case of a siphon functioning to control the water level in an upstream reservoir, the lowest point, or level, corresponds to the condition when the air connection is wide open and the highest point corresponds to the condition of the siphon when the air inlet is completely closed.

The systems or arrangements for realizing the advantages of the "partialization" principle may take various forms. For example, the flow of air through the air inlet connection may be controlled directly by the upstream level which acts to close the opening directly as the level rises. In order to increase the sensitivity of the system, however, it is preferable to close the air inlet connection, not by the direct action of the upstream level, but through the intermediation of another level related to the upstream level, for example, a level established within a basin fed by a sluice gate from the reservoir, the level of which is to be regulated. This procedure permits the regulation of the discharge of the siphon from a maximum to a discharge which may approach only ¼ or ⅓ of the maximum discharge. At lower rates of discharge, the rate of air flow is high and since the air passage is closed only by the water, a mixture of air and water is drawn in, which may, for no apparent reason, cause unpriming or repriming of the siphon.

These arrangements do not, therefore, permit a stable functioning with low discharges. Moreover, in order to discharge only ⅓ of the maximum discharge, it is necessary to provide a large change in level. The present invention has the advantage that it avoids these inconveniences and permits a stable regulation at all rates of discharge, even very small, and this is brought about with a small change in level.

According to the present invention, the regulation of the flow of a siphon is effected by a double regulation of the admission of the air of "partialization." The first regulation consists in maintaining the depression at the inside of the siphon substantially constant with consequent substantially constant discharge by providing means for automatically modifying the size of the air inlet opening. The second regulation consists in modifying the value of the regulated depression with respect to the initial value of the first regulation. This double regulation has for a consequence the stabilization of the discharge of the siphon at a certain value and the second regulation makes it possible to modify that value at will.

This second regulation can be effected either by direct or remote control, or by an automatic control responsive to a given demand or supply factor, for example, the size of the opening of a turbine, or the level of the upstream body of water, or a discharge, or any other given factor of dimension or quantity, and may be brought about by any suitable means.

By way of example, the first stage of regulation according to the invention may be realized by means of a movable closure disposed adjacent the air inlet and having a tendency to open under the inspiration of the liquid flowing through the siphon, but at the same time yielding to a substantially constant restoring force or a restoring force varying slightly as the closure travels toward and away from the opening. This restoring force may be exerted, for example, by a spring having a low rate of change of tension, or a partially immersed body of sufficiently small section to permit it to sink more or less into the liquid according to the variations of the force applied to the closure and thus constituting a float of variable immersion.

The second regulation may be effected through modification of the restoring force, for example, by modifying the float or its lever arm or the initial tension of the spring. The second regulation may also be effected in direct relation with changes in the level of the liquid into which a float is immersed, whether the liquid level being regulated is upstream or downstream from the siphon.

The first regulation may even be accomplished by means of a balanced valve, the opening and closing of which is under control of the depression or reduced pressure prevailing in the siphon. This control may be established by means of a device responsive to changes in pressure, for example, by a manometric membrane or a contact manometer.

Finally, in order better to disclose the invention, there is set forth below, by way of non-limitative examples and with the air of the attached drawings, a description of several arrangements for applying the invention:

Fig. 1 is in part a vertical section and in part a side elevation showing one embodiment of the invention as applied to a siphon of conventional form;

Fig. 2 is likewise in part a vertical section and in part a side elevation of another embodiment of the invention;

Fig. 3 is a vertical section of a modified arrangement for mounting the closure;

Fig. 4 is in part a vertical section and in part a side elevation showing still another embodiment of means for regulating the admission of air in accordance with the invention and which includes a float of variable immersion;

Fig. 5 is in part a vertical section and in part a side elevation of another embodiment of the invention in which the admission of air is regulated in accordance with the demand for liquid.

According to the form of the invention illustrated in Fig. 1, a cup-shaped valve 1 is suspended by a spring 2 and the stem 3 within an enlarged chamber 4 in position to regulate the flow of the air into the chamber from the outside atmosphere through the opening 5. The chamber 4 is connected with the throat of the siphon 6 by the pipe 7. The spring 2 is connected to the internally threaded nut 8 which is movable up and down on the threaded rod 9 by rotating the regulating wheel 10. A pointer 11 is pivotally supported at 12 by the nut 8 and also at 13, leaving the opposite end free to travel along an indicating scale 14.

It will be seen that whatever be the distance at which the valve finds itself away from the opening that it regulates, and consequently whatever be the flow of air past it, the force that this valve sustains because of the air passing through is equal to the product of the pressure drop across the valve times the area of the valve. For example, if the valve is balanced with a weight P through the intermediary of a restoring pulley or lever having a mechanical advantage, the depression or reduced pressure is automatically regulated to the value P/S. This being understood, it is necessary then that the adjustments of the depression be made slowly having regard to the inertia of the movable equipment including the weight and the valve. Since the siphon regulates the depression and consequently the discharge to a constant value, the values of these may be modified by changing the weight P or its lever arm.

In most forms of the apparatus, as in that of Fig. 1, it is preferred to use a spring which has a large deflection per unit force applied, i. e., a feeble inertia, and of which the initial tension may be easily regulated by displacing its point of attachment according to the water level or other magnitude that is to be regulated. As above indicated, in the apparatus shown in Fig. 1 this tension is regulated by turning the wheel 10.

Starting from a state of equilibrium, if for example the depression happens to increase, the volume of air that may flow past the valve is immediately increased in large proportions thereby increasing the flow of air susceptible of being entrained by the siphon. The depression then falls again immediately until the initial equilibrium is reestablished and the operation becomes stable. This takes place even under conditions of low discharge and is the more pronounced the more slack the spring.

According to the invention, therefore, any appropriate device may be used as the movable closure if it has a tendency to open in response to the depression of the siphon and is so arranged with relation to the siphon that by imposing upon it a restoring force that varies only slightly in the course of travel of the closure toward and away from closed position, the flow of air past the closure increases very quickly with increase in the depression. In particular, the valve in the form of a bell-shaped cup and balanced by a spring or an equivalent force insures almost a constant depression; that is to say, the variations of the flow of air past the valve into the siphon are very large as compared to the variations in the pressure difference between the atmosphere and the interior of the siphon. When using a spring it is sufficient that the decrement or stiffness of the spring be weak enough to insure that the discharge of air past the closure may increase much faster than the discharge of air entrained by the siphon in response to the same depression.

Reviewing the action of the spring in more detail, it must be remembered that the liquid flowing through the siphon constantly tends to entrain air at the siphon throat. Under steady conditions, air passes into the throat through the valve at the same rate at which air is removed from the throat due to entrainment by the flowing water. Starting with such steady conditions, let it be assumed that the water begins to entrain air at a faster rate, thereby further reducing the pressure at the siphon throat. This reduction of the throat pressure causes an opening movement of the air valve. The spring biasing the valve toward closed position has a sufficiently small decrement, or stiffness, so that the valve opening movement in response to a given drop in pressure in the siphon throat increases the rate of flow of the entering air by an amount sufficient not only to supply the increased entrainment of air by the water but also to build up the air pressure in the throat substantially to its previous value. In that manner, the pressure at the siphon throat is maintained substantially constant. Since it is well-known that the rate of flow of liquid through a siphon depends upon the pressure at the siphon throat, it follows that the rate of flow of water through the siphon is likewise held substantially constant.

In Fig. 2 there is shown a somewhat similar system wherein the control of the depression and consequently the magnitude of the discharge is under control of the upstream level. As in Fig. 1 the valve is shaped like a cup. Here the valve 1 is pivotally connected at 15 to the rod 16 to provide a slight play and permit the valve always to be presented in proper position with respect to its seat. The rod 16 is connected at its opposite end to a piston 17 moving in a cylinder 18 and thus may form a dash-pot. A restoring force is applied by a spring 19 compressed between the piston 17 and the bottom of the cylinder 18. The cylinder 18 is connected to the lever 20 by a link 21. The lever 20 is pivotally connected at one end to a fixed support 22 and at the other end is pivotally connected to a rod 23 which in turn is connected at its lower end to a float 24 positioned in the reservoir of which the level is to be regulated. As shown the float is made of sufficient size and of such shape as to insure that the variations in the restoring force, arising from the compression of the spring, do not substantially vary the immersion of the float. In other words, the float is so proportioned that it can be considered as having a substantially fixed relation to the level of the liquid in the reservoir.

For a given level, the device of Fig. 2 operates in the same manner as the device of Fig. 1; that is to say, the siphon has a given constant discharge as long as the water level remains constant. When the level changes this changes the initial compression of the spring much as is the case in Fig. 1 when the position of the pointer 11 is changed, thereby bringing about a different rate of discharge. In this way the discharge of the siphon is automatically made to conform to the upstream level. It will be understood that the total decrement or range of regulation is determined by the variation of the level necessary to vary the discharge from zero to maximum discharge. The discharge of the siphon will be weakest when the spring is in its state of greatest compression and vice versa. In comparing this result with that which has been described earlier, it will be seen that the more it is sought to find a small decrement, the greater the risk of lessening the stability, especially in the case of small discharges.

In most cases the reservoir is of limited extent and the upstream level depends on the discharge of the siphon, the level remaining constant only if the flow of the siphon is equal to the sum of the flows entering the reservoir. In certain cases, therefore, the stability of the level of the water in the reservoir may be improved because as the level of the water tends to rise the flow of the siphon will tend to increase and, inversely, as the level of the water tends to become lower the flow of the siphon will become less.

Another useful modification of the valve installation is shown in Fig. 3. The valve itself has the same form as that of Fig. 2, but its seat is constituted merely of a flat plate 25 pierced by a hole 26 of a diameter slightly smaller than the valve. The valve is suspended on a spring 27 which is connected to the lever 20 and the latter in turn is connected to a float, not shown. This arrangement permits of slightly lateral displacement of the valve without interfering with its proper seating when the valve is in closed position.

In this arrangement the valve operates in substantially the same manner as before, but the possibility of the slight lateral displacement eliminates the need for means for guiding the valve stem and thus dampening action due to friction between the stem and the guide is avoided. At the same time the direct connection with the spring permits the valve to pivot slightly about the point of connection while preventing it from deviating too much from its normal position.

In certain cases rapid vibrations of the valve will be observed. These are due principally to the fact that the entrainment of the air into the water discharged through the siphon becomes substantially stopped and as a result the force exerted on the valve then varies continually. These vibrations do not have serious disadvantages from the point of view of the stability of the functioning of the apparatus. The valve should be made sufficiently strong to withstand them. Nevertheless particularly for important installations, as for example for siphons for evacuating floods, it may be desirable to avoid these vibrations. In this case conventionally regulated dash-pots may be interposed between the valve and the connections to the float. This will serve to prevent too rapid displacement and excessive fluctuations of the valve.

In Fig. 4 there is shown still another embodiment of the invention. In this case a float 30 of variable immersion is used in order to create the restoring force. The valve is constituted by a simple flat plate 31 of a diameter a little larger than the opening to be closed. In contrast with the arrangement shown in Fig. 2, where the position of the float was considered as rigidly fixed with respect to the upstream level, here the float is of small section and capable of being immersed to a greater or lesser degree. Therefore in opposing the movements of the valve 31, to which it is rigidly connected by the lever 20 and rod 23, it imposes a restoring force varying directly with its degree of immersion; that is to say, it acts exactly like a spring. In other words, for a given level the restoring force is proportional to the extent of movement of the valve, and if the level varies, all of the values of the restoring force are changed from a constant quantity.

In Fig. 5, there is shown another embodiment of the invention in which the second regulation is effected in response to the demand for water from the siphon. Many of the parts in Fig. 5 correspond to those of Fig. 2 and have been given identical reference numerals. In Fig. 5, the rate of liquid flow at a point downstream from the siphon is measured by a venturi 32 whose inlet and throat are respectively connected to the interiors of bellows 33 and 34. These bellows have their free ends connected to opposite ends of a lever 35, which is fulcrumed at an intermediate point. The left end of lever 35 is pivoted at 36 to a link connected through a relay 37 to the end of lever 20, which operates valve 1 in the manner described in connection with Fig. 2.

When the demand for liquid at the discharge end of the conduit increases, the rate of flow through venturi 32 increases, thereby producing an increased pressure difference between the entrance and throat of the venturi. This increase in the pressure difference acts to turn the lever 35 clockwise about its fulcrum. The left end of the lever 35 acts through relay 37 to raise the end of lever 20 and thereby move valve 1 in a closing direction. The rate of flow of air into the siphon is thereby decreased, and the rate of flow of liquid through the siphon is increased to balance the increased demand.

In a similar manner, when the demand decreases, the rate of flow of liquid through the siphon is decreased to balance the change in demand.

It will be understood that the regulation system of the present invention would not function with an ordinary float of substantially constant immersion connected directly to the valve without the intermediation of a spring.

The use of a float of variable immersion such as 30 has the additional advantage that it opposes a certain resistance to the rapid oscillations and consequently limits the vibrations of the valve. In order to increase this dampening effect, the float may be provided with a flange or collar which does nothing to change its useful section from the point of view of the ability to float but which introduces a substantial resistance to longitudinal displacement of the float.

It will be understood that various arrangements other than a float may be employed for establishing an operative connection between the valve and the upstream level; for example, various detector devices and electrical arrangements responsive to changes in the upstream level may be substituted for the float and appropriately connected with the valve.

It will be further understood that the invention is by no means limited in other respects to the various embodiments above described and that many changes may be made in the arrangements and details of the regulating means without departing from the invention which is not to be deemed to be limited otherwise than as indicated by the appended claims.

I claim:

1. An apparatus for controlling the flow of a liquid, comprising a siphon, an air inlet connection to the throat of the siphon, means for controlling the flow of air through said connection, said means comprising a valve movable toward open position in response to an increase in the depression of the pressure in said siphon, means operatively connected with said valve for constantly imposing a restoring force thereon tending to move said valve toward closed position and means responsive to a change in the demand for the liquid being discharged through said siphon to automatically modify the degree of depression maintained in said siphon.

2. An apparatus for controlling the flow of a liquid, comprising a reservoir, a siphon having its inlet connected to said reservoir, an air inlet connection to the throat of the siphon, means for controlling the flow of air through said connection, said means comprising a valve movable toward open position in response to an increase in the depression of the pressure in said siphon, means operatively connected with said valve for constantly imposing a restoring force thereon tending to move said valve toward closed position, and means responsive to a change in the level of the liquid in said reservoir for modifying the degree of depression maintained in said siphon in a direction tending to change the discharge of liquid through said siphon in such relation to the change in the level of the liquid in said reservoir as to tend to restore the liquid level to its initial position.

3. Liquid flow control apparatus, comprising a siphon, an air inlet at the top of the siphon, a valve in the air inlet movable in an opening direction in response to an increase in the difference between atmospheric pressure and the pressure in the siphon, means applying to said valve a force which acts in a closing direction and which is substantially constant in all positions of said valve, so that a small variation in said pressure difference produces a large and rapid movement of said valve tending to restore said pressure difference to its previous value, and means operable to vary said closing force so as to vary the value of said pressure difference maintained by the action of the valve.

4. Liquid flow control apparatus as defined in claim 3, in which said siphon has one end connected to a body of liquid, and including means to move said force varying means in response to variations in the level of said body of liquid.

5. Liquid flow control apparatus, comprising a siphon, an air inlet at the top of the siphon, a valve in the air inlet movable in an opening direction in response to an increase in the difference between atmospheric pressure and the subatmospheric pressure in the siphon, a spring biasing said valve in a closing direction and having a decrement weak enough so that a given change in pressure in the siphon, corresponding to a given change in the rate of flow of air through the air inlet into the throat of the siphon, will produce a valve movement great enough to change the rate of flow of air through the valve by a greater amount than said given change in pressure, so that the pressure in the siphon will be quickly restored substantially to its previous value.

6. Liquid flow control apparatus, comprising a siphon, an air inlet at the top of the siphon, a valve in the air inlet movable in an opening direction in response to an increase in the difference between atmospheric pressure and the pressure in the siphon, means applying to the valve a force which acts in a closing direction and which varies only slightly as the valve moves toward and away from a predetermined position, so that a small variation in said pressure difference produces a large and rapid movement of the valve in a direction tending to restore said pressure difference to its previous value, means responsive to variations in the supply of water to the siphon to vary the value of said pressure difference required to maintain a stable partialized flow through the siphon, and means operatively connecting said supply responsive means to said valve means to vary the rate of flow in accordance with variations in the supply.

7. Liquid flow control apparatus, comprising a conduit, a siphon in said conduit, an air inlet at the top of the siphon, a valve in the air inlet movable in an opening direction in response to an increase in the difference between atmospheric pressure and the pressure in the siphon, means applying to the valve a force which acts in a closing direction and which varies only slightly as the valve moves toward and away from a predetermined position, so that a small variation in said pressure difference produces a large and rapid movement of the valve in a direction tending to restore said pressure difference to its previous value, means responsive to variations in a head condition in said conduit to vary the value of said pressure difference required to maintain a stable partialized flow through the siphon and means operatively connecting said head condition responsive means to said valve means to vary the rate of flow in accordance with variations in said head condition.

8. Liquid flow control apparatus, comprising a siphon, means defining an air inlet in communication with the top of the siphon, a valve associated with said inlet and responsive to variations in the pressure differential between the atmospheric pressure and the pressure at the top of the siphon to vary the amount of air admitted through said inlet, means for applying to said valve a force acting in a closing direction, said force varying only slightly as the valve moves toward and away from a predetermined position and being of the same order as the opposing force corresponding to the pressure difference required to maintain a predetermined partialized liquid flow through said siphon, so that a small variation in said pressure differential produces a large and rapid movement of said valve tending to restore said pressure differential to its previous value.

9. Liquid flow control apparatus as defined in claim 8, which includes means responsive to a change in the supply of liquid to said siphon to vary the pressure differential required to maintain a stable partialized flow of liquid through the siphon, and means operatively connecting said supply responsive means to said valve to vary the rate of flow of liquid through said siphon in accordance with variations in the supply.

10. Liquid flow control apparatus as defined in claim 8, which includes means responsive to a change in the demand for liquid supplied through said siphon to vary the pressure differential required to maintain a stable partialized flow through the siphon and means operatively connecting said demand responsive means to said valve to vary the rate of flow of liquid through said siphon in accordance with variations in the demand.

PIERRE F. DANEL.

References Cited in the file of this patent

UNITED STATES PATENTS

| Number | Name | Date |
|---|---|---|
| 969,516 | Bouchaver | Sept. 6, 1910 |
| 1,131,823 | Clevenger | Mar. 16, 1915 |
| 1,556,072 | Buck | Oct. 6, 1925 |
| 2,086,942 | Mandeville | July 13, 1937 |
| 2,232,267 | Price | Feb. 18, 1941 |
| 2,363,313 | Gavin | Nov. 21, 1944 |
| 2,392,458 | Carlson | Jan. 8, 1946 |